United States Patent [19]

Morine et al.

[11] 3,961,755
[45] June 8, 1976

[54] APPARATUS FOR DISPENSING IN A PREDETERMINED PATTERN

[75] Inventors: Richard L. Morine, Mentor; James J. Hokes, Lakewood, both of Ohio

[73] Assignee: Fedco Inc., Mentor, Ohio

[22] Filed: Mar. 10, 1975

[21] Appl. No.: 556,870

Related U.S. Application Data

[63] Continuation of Ser. No. 382,743, July 26, 1973, abandoned.

[52] U.S. Cl. ............................... 239/319; 118/25; 118/315; 118/DIG. 8
[51] Int. Cl.² ........................................ B05B 7/00
[58] Field of Search .............. 118/2, 8, 24, 25, 315, 118/325, DIG. 8; 239/319; 222/194

[56] References Cited
UNITED STATES PATENTS

| | | | |
|---|---|---|---|
| 1,581,322 | 4/1926 | Reed | 118/325 X |
| 1,887,416 | 11/1932 | Matlack | 239/319 |
| 2,459,324 | 1/1949 | Kellner | 118/DIG. 8 |

*Primary Examiner*—Robert B. Reeves
*Assistant Examiner*—Francis J. Bartuska
*Attorney, Agent, or Firm*—Daniel G. Blackhurst

[57] ABSTRACT

The specification and drawings disclose an apparatus for dispensing a fine dispersion of grease into the interior of baking pans. The disclosed apparatus comprises a continuous screen belt which moves above a conveyor on which the pans are traveling. Above one run of the belt is an air chamber from which high-velocity, short-duration air jets are directed downwardly through the screen. The air jets are laid out in a pattern generally corresponding to the shape of the interior of the baking pans. Additionally, a roller and hopper assembly is provided to apply a coating of grease to the mesh so that the air passing therethrough causes the grease to be dispersed into the pans.

5 Claims, 6 Drawing Figures

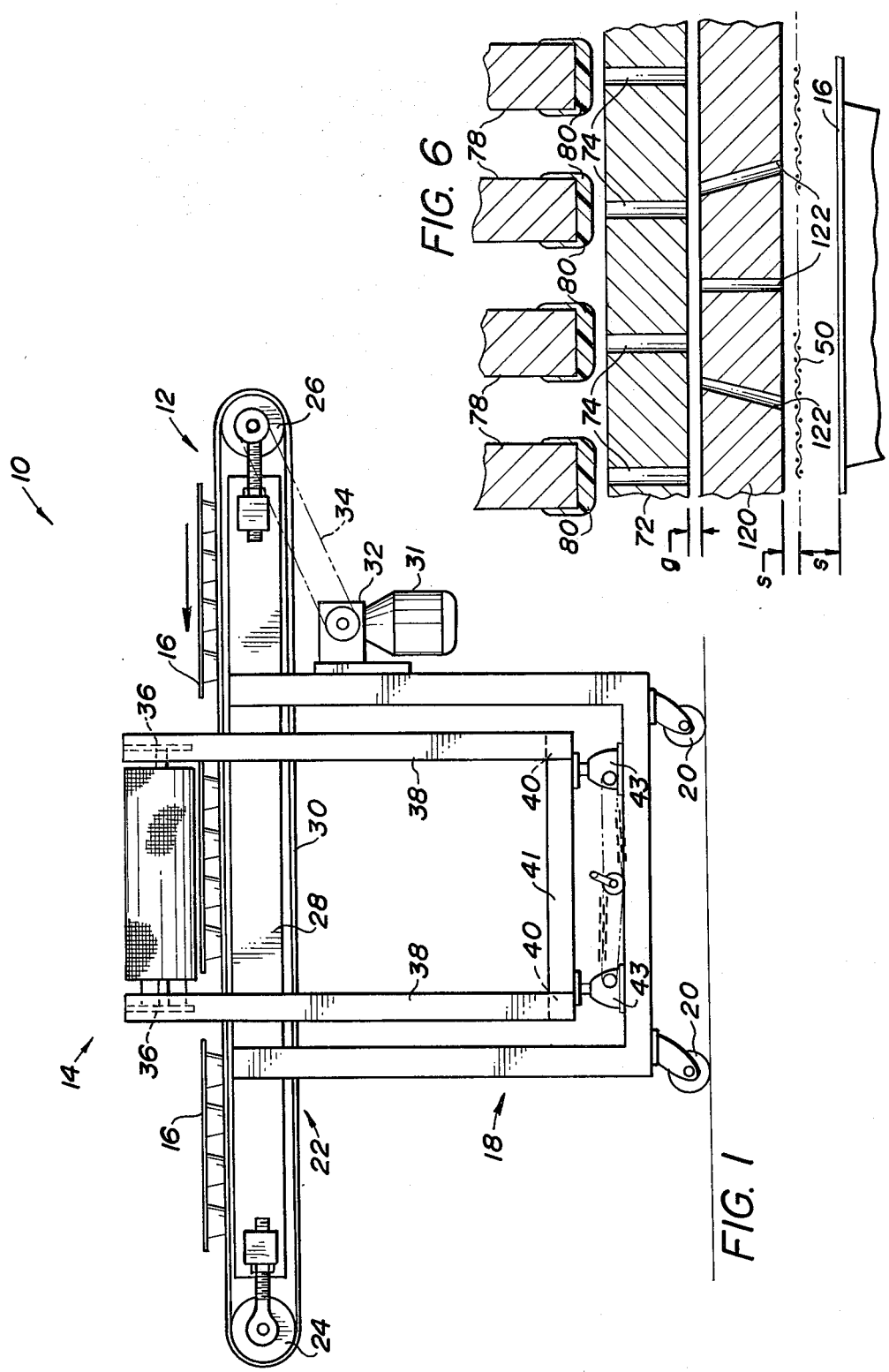

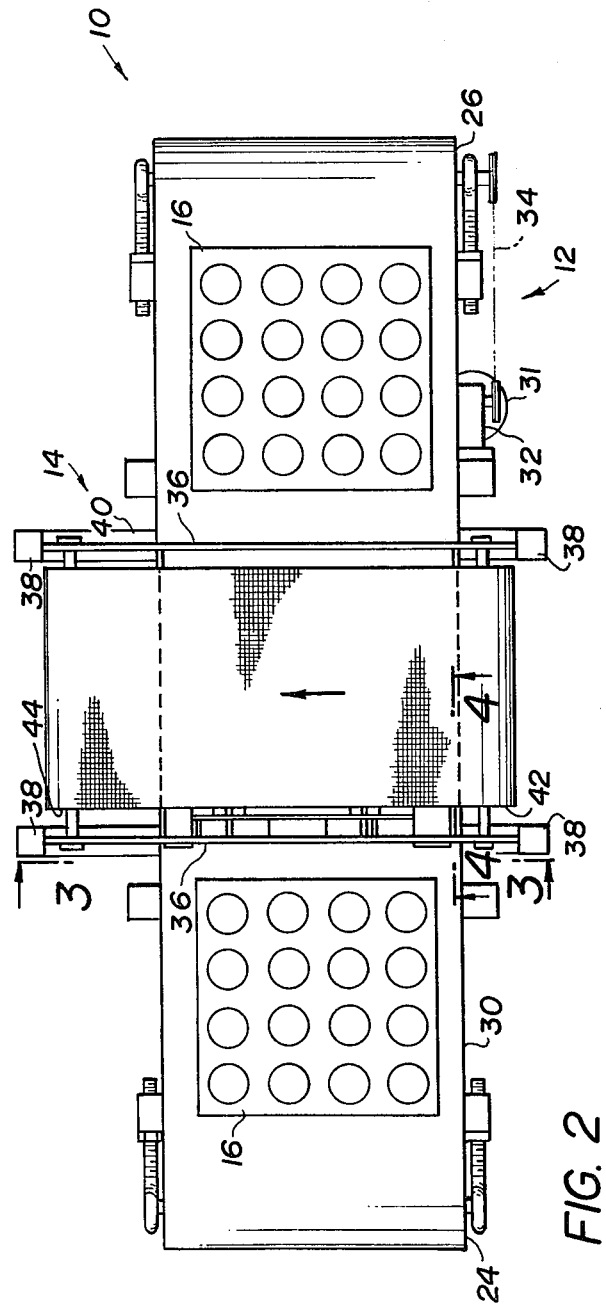
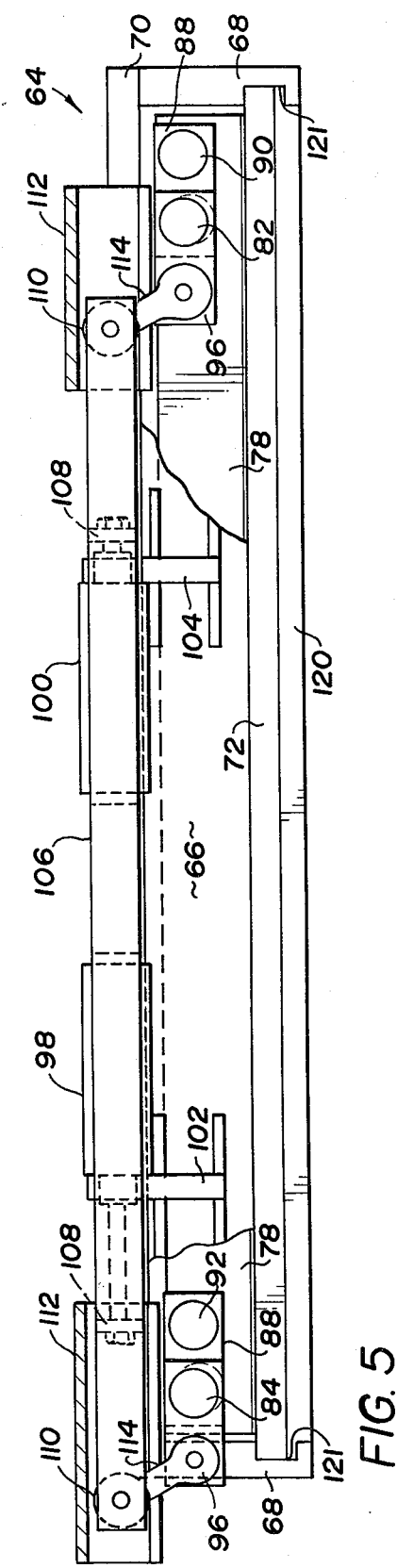

APPARATUS FOR DISPENSING IN A PREDETERMINED PATTERN

This is a continuation, of application Ser. No. 382,743, filed July 26, 1973, now abandoned.

The subject invention is directed toward the coating art and, more particularly, to an apparatus for applying a viscous fluid to a surface or receptacle automatically in a predetermined pattern.

The invention is especially suited for use in applying a uniform coating of grease or release agent to the interior of a baking pan and will be described with particular reference thereto; however, as will become apparent, the invention is capable of broader application and could be used for applying other similar substances to different surfaces.

As is well known in the baking art, it is generally necessary to apply a very uniform coating of grease to the interior surface of cake pans or the like prior to filling them with batter. The amount of grease applied and the uniformity of its application are relatively critical. If an area of the pan is missed, sticking of the baked cake results. Over application or non-uniform application will effect the quality and texture of the cake. In some instances, non-uniform rising of the cake during baking will result.

In addition to its effect on the product, poorly-applied grease can present other problems. For example, if the grease is applied to an exterior portion of the pan, it burns off during the baking operation. This produces smoking and difficult pan cleaning problems. Similarly, pan conveyors will become coated with grease and require frequent cleaning.

Many different approaches have been tried in an attempt to overcome the noted problems. Most commonly tried has been a multiplicity of fine dispensing nozzles arranged in a pattern to spray the interior bottom and side walls of the pan. There are several difficulties with the use of these nozzles. First, the nozzles must be fine and, as a consequence, frequent clogging is encountered. Secondly, a different nozzle arrangement must be provided for each different size pan. Moreover, as will subsequently be discussed, the pumping of the grease is believed to have a detrimental effect on its characteristics.

Another somewhat more successful prior art approach has involved the use of an array of closely-spaced, rapidly-rotating disks having a portion of their peripheries in a container or tank of grease. The grease was thrown from the disks and against the pans. This arrangement required that the pans be in an inverted position over the disks. Additionally, in order to apply grease to only the interior of the pans, a mask or template having openings corresponding to the pans was needed. The mask, of course, became covered with grease and had to be cleaned or squeegeed following each use.

One other type of pan greasing apparatus proposed in the prior art comprised a mesh or screen which was coated with grease and positioned over the pans. An air outlet nozzle was associated with the screen on the side opposite the pans and moved over the surface of the screen to expel the grease toward the pans. With this apparatus, problems were encountered in obtaining uniform coverage of the interior of the pans. Additionally, a mask or template was also required as with the other prior art devices.

The problem of providing automatic pan greasing apparatus is further complicated by the nature of the grease itself. Although broadly termed a "grease", it is normally a thixotropic mixture of oil and flour. Additionally, it generally has the property such that it will separate or lose many of its desired characteristics if it is "worked" excessively. Many of the prior art devices, because of the pumping and repeated handling of the grease, caused the grease to lose its desirable properties. Moreover, in certain of the prior art devices, the grease underwent substantial aeration and, if allowed to sit in the pans for a substantial period of time prior to filling with batter, it would separate out on the pan walls.

As can be seen from the above, there has been little success with automatic pan greasing apparatus. However, the subject invention provides an apparatus of the general type described which is capable of relatively high-speed, automatic greasing of the interior of cup-shaped pans. The apparatus is such that the pattern of grease application is nearly exactly within the pan. Moreover, the arrangement is such that vertical sides of the pan can be coated uniformly. Additionally, the greasing pattern can be rapidly changed to suit any desired pan configuration.

Generally, the subject invention contemplates an apparatus comprising an endless belt of foraminous material constrained to travel in an endless orbital path and having at least one run which is generally planar. Means are provided for positioning pans closely adjacent to the planar run with their open or top side facing and generally parallel to the belt. Positioned on the opposite side of the planar run are air supply means having a multiplicity of air outlet orifices relatively uniformly distributed over an area generally corresponding to the cup-shaped opening of the pan. The orifices are arranged to direct air through the belt and at least some of the orifices are positioned to discharge air at an angle relative to the planar run. Coating means are provided for applying a uniform coating of grease to the belt; and, control means are provided to supply a short-duration, high-velocity impulse of air through the orifices when a pan is in location under the belt and generally in alignment with the orifices.

In use, the grease on the belt is impacted by the air discharged through the orifices. The impact expells the grease from the belt and disperses it over the pan in a fine mist. The orifices are arranged so that the vertical portions of the interior walls of the pan are also uniformly coated.

The invention also contemplates that the air supply means will preferably comprise a chamber having a lower wall which faces the planar run. The lower wall has a large number of air outlets uniformly located throughout its area. The air outlet orifices comprise small openings formed through a removable plate positioned over the bottom wall. This allows the discharge pattern to be changed merely by removing one plate and replacing it with another.

More specific aspects of the invention concern the means used for controlling the discharge of air through the orifices. Preferably, the means comprise valve members positioned within the chamber and operated by actuating means which rapidly open and close the outlets in the bottom wall. In this regard, the outlets in the bottom wall are in aligned rows and the valve members desirably take the form of elongated bars positioned to open and close all outlets in a single row.

By use of the described chamber and valve arrangement, control of the grease discharge pattern is effected by changing only the removable plate. Thus, all valves remain in operation continuously with the plate itself serving as the ultimate valving mechanism. This allows use of a comparatively simple valve mechanism.

The main air supply chambers provide a reservoir of pressurized air while the small gap or space between the bottom wall and the removable plate serves as a very shallow, low-volume distribution chamber. This relationship avoids the necessity of having the valved openings aligned with the discharge orifices. However, it is desirable to have a substantial number of valved openings located relatively uniformly over the bottom wall.

Because none of the air orifices or valved openings handle grease, there are no problems with clogging as with many prior art devices. Additionally, since the pattern of grease dispersion can be rapidly changed or altered, the apparatus is particularly flexible.

Accordingly, a primary object of the invention is the provision of an apparatus of the type described which can dispense relatively viscous fluids in a closely controlled, predetermined pattern.

Another object is the provision of an apparatus which can dispense a uniform coating of grease over the interior of cup-shaped containers or receptacles.

A further object is the provision of an object of the type described which can be used to apply grease to both the bottoms and side walls of pans in a fine, even coating.

Yet another object is the provision of a pan greasing apparatus in which the pattern of dispensing can be quickly changed.

A still further object is the provision of an apparatus of the type described which is simple and reliable in operation.

The above and other objects and advantages will become apparent from the following description when read in conjunction with the accompanying drawings wherein:

FIG. 1 is a side elevation of a grease dispensing apparatus formed in accordance with a preferred embodiment of the subject invention;

FIG. 2 is a plan view of the apparatus shown in FIG. 1 (portions have been broken away to show certain areas more clearly);

FIG. 5 is an enlarged cross-sectional view taken on line 5—5 of FIG. 4; and,

FIG. 6 is an enlarged cross-sectional view showing the relationship between the valve elements, the pattern plate and the screen.

Figure 3:
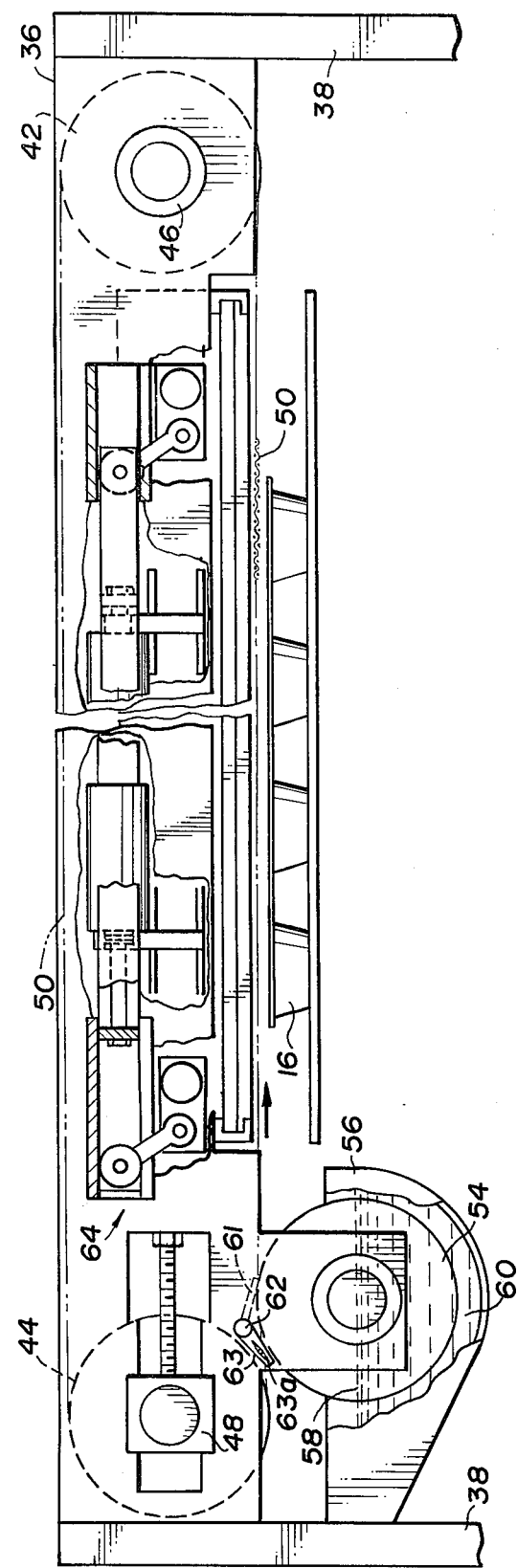
FIG. 3 is a cross-sectional view taken on line 3—3 of FIG. 2.

Referring more particularly to the drawings wherein the showings are for the purpose of illustrating a preferred embodiment of the invention only and not for the purpose of limiting same, FIGS. 1 and 2 show the overall arrangement of a pan greasing or dispensing apparatus 10 including a pan conveyor assembly 12 and a grease dispensing apparatus 14. As will be explained more fully hereafter, the grease dispensing or dispersing apparatus 14 is positioned to extend transversely of the upper run of the conveyor 12 and to apply a grease or similar substance to the interior surfaces of the pan 16 passing thereunder.

The details and construction of the conveyor assembly 12 form no particular part of the invention and have been illustrated merely to show one overall system in which the grease dispensing and dispersing apparatus 14 could be utilized. Broadly, the conveyor assembly 12 is shown as including a relatively rigid, welded frame 18 which is mounted for movement on casters 20 so that it can be rolled into position adjacent any type of baking processing line. Carried on the upper surface of the frame 18 is a conventional, endless belt-type conveyor unit 22 comprising first and second rollers 24 and 26 suitably supported from side plates 28. An endless belt or the like 30 is trained about rollers 24 and 26. The belt is driven from a conventional electric motor 31 connected with roller 26 through a right-angle drive 32 and a chain 34. As will subsequently be discussed, the conveyor 22 can be constantly driven or moved in indexed, step-by-step movement depending upon the particular type of controls utilized for actuation of the grease dispensing apparatus 14.

One aspect of particular importance to the subject invention is the arrangement and general method of operation of the grease dispensing apparatus 14. As will subsequently become apparent, the apparatus 14 could be utilized in combination with many different types of pan conveying apparatus. Additionally, although shown extending transversely to the conveyor 12, it should be appreciated that the assembly could have many different positions relative to the conveyor subject to certain limitations which will become clear.

In general, the apparatus 14 is shown as including a pair of side plate members 36 which are suitably supported in spaced-apart relationship by vertical support members 38. Members 38 are carried from horizontally-extending frame members 40 interconnected by cross members 41. Suitable screw jacks or the like 43 are arranged so that the elevation of assembly 14 can be adjusted relative to the conveyor.

As best shown in FIG. 3, carried between the side plate members 36 are first and second rollers 42 and 44. Rollers 42 and 44 are supported in bearing blocks 46 and 48, respectively. Bearing blocks 48 are mounted for longitudinal adjustment relative to the side plates 36. Trained about the rollers 42 and 44 is an endless, flexible sheet 50 of suitable foraminous material such as wire mesh or screening. The preferred form and size for the mesh will subsequently be discussed in some detail.

The roller 42 is driven by a motor (not shown) so as to cause the mesh or flexible sheet 50 to move in the direction of the arrow of FIG. 3. Positioned generally beneath roller 44 and in engagement with the lower run of sheet 50 is a third roller member 54 which is similarly mounted for rotation between side plates 36. Roller 54 is positioned within a chamber or hopper 56 so that a portion of its periphery is at all times beneath the level 58 of a suitable pan grease 60 carried within hopper 56. The roller 54 is driven in the direction of the arrow by contact with sheet 50 and, during rotation, carries a layer of the grease 60 into engagement with the traveling sheet 50. The meshes or openings within the sheet 50 are, of course, filled or covered with a relatively thin layer of the grease.

The thickness of the grease layer or the quantity of grease retained on the sheet 50 can be controlled to some degree by a wiper bar 61 which extends completely across the screen on the side opposite roller 54. Wiper bar 61 is rotatably mounted on shaft 62. The spacing between the wiper bar 61 and the screen can be adjusted by movement of lever arm 63. Suitable lock means 63a are provided to retain the bar in the desired position of adjustment.

The lower run of the sheet 50 is positioned so as to pass closely adjacent to the top surface of the pans 16. The preferred spacing of the screen from the pans will be described. However, for the present, it is sufficient to note that when the coated sheet passes over the pan, the apparatus is arranged to discharge high-velocity, short duration air jets or impulses through the screen to expel or dispense the grease from the mesh into the openings of the pan in a fine, uniformly-dispersed mist or spray.

Figure 4:
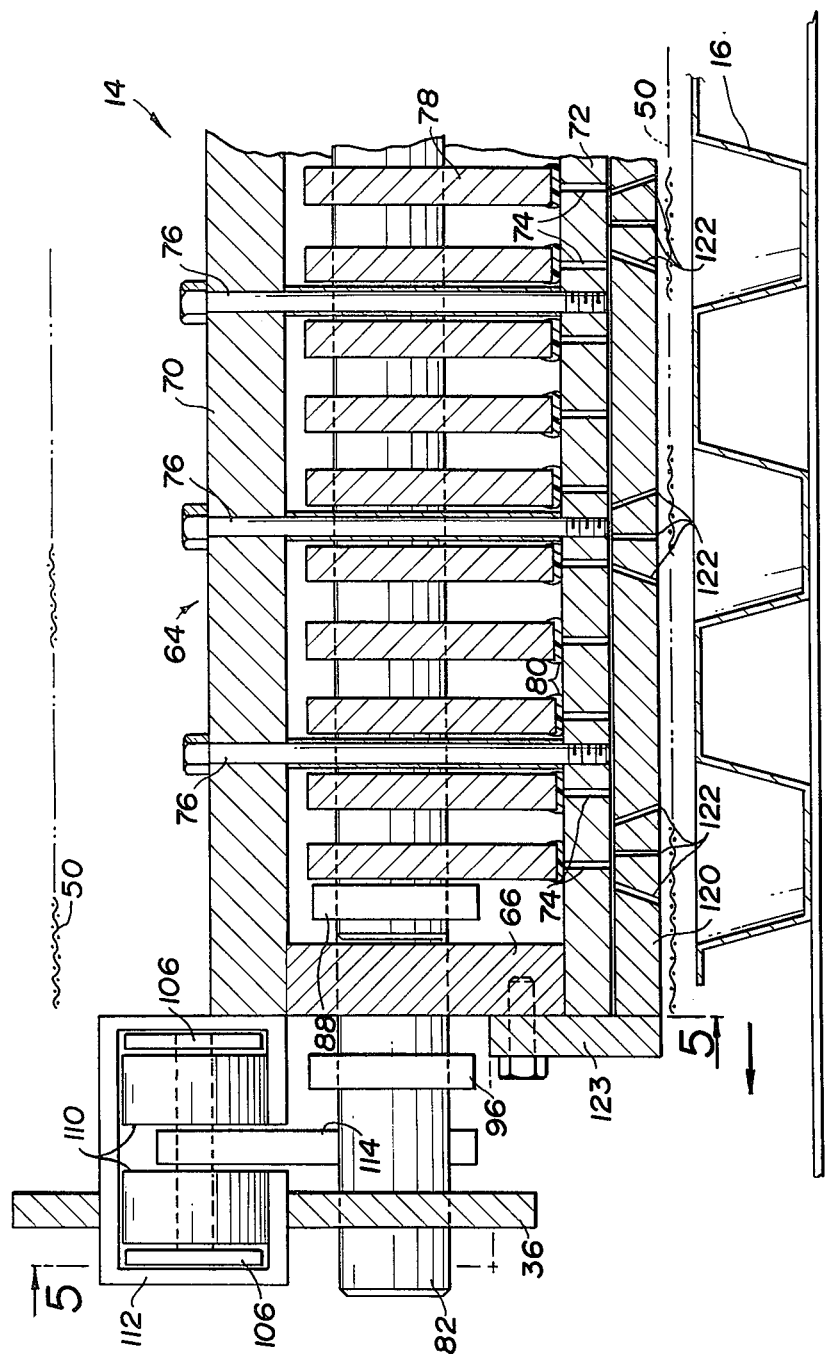
FIG. 4 is a cross-sectional view taken on line 4—4 of FIG. 2.

The air dispensing and discharging could be carried out by many different structures meeting certain parameters which will subsequently be described; however, the preferred embodiment utilizes a main air chamber unit 64 which comprises a pair of spaced side plates 66 and connecting end plates 68 (see FIGS. 4 and 5). The upper wall 70 of the chamber unit 64 is closed, and the lower wall comprises a horizontally-extending plate member 72 which is provided with a multiplicity of small openings 74 which are preferably closely spaced and laid out in rows which extend generally parallel to the side plates 66. Except for the openings 74, the chamber unit 64 is otherwise sealed but connected with a source of air under pressure. It should also be noted that preferably, reinforcing studs or the like 76 extend between the top wall 70 and the bottom wall 72 and are rigidly connected to each of the top and bottom walls.

The discharge of air from the outlets 74 is controlled by valve members 78 in the form of rigid bars which extend the length of each row of openings 74 and are arranged to be moved upwardly a short distance to permit air to pass through the openings. Preferably, the bars 78 include a resilient lower surface 80 which serves as the actual valve element and sealingly engages the upper surface of the lower wall 72.

As mentioned earlier, it is important that the air passing through the openings 74 be discharged in a very short-duration, high-velocity blast or jet. For this reason, the actuating means for the valve members 78 are arranged to move the valve members upwardly for a very short period of time. Although many different types of actuating mechanisms could be used, in the subject embodiment the actuating assembly comprises a pair of horizontally-extending shaft members 82 and 84 (see FIGS. 4 and 5) which extend transversely across the interior of the chamber and are rotatably and sealingly mounted in the side walls 66. At the left-hand end (as viewed in FIG. 4), means are provided for oscillating the shafts 82, 84. The oscillation of the shafts 82, 84 is transmitted into vertical movement of the valve members 78 by crank arms 88 carried at opposite ends of the shafts 82, 84. The ends of the crank arms 88 are positively connected to the ends of horizontally-extending shafts 90, 92 which are rotatably received in and carry the valve members 78. As can be appreciated, oscillation of the shafts 82, 84 causes the valve members 78 to be raised and lowered, thereby opening and closing the outlets 74. To permit the valve members to move vertically relative to shafts 82, 84, the valve members are provided with oval-like openings through which the shafts pass.

As previously mentioned, the period of time during which air is permitted to pass from the air chamber unit 64 through openings 74 must be relatively short. For this reason, the actuating means for the shafts 82 and 84 are designed so that a quick opening and closing movement is achieved. Referring more particularly to FIG. 5, it will be noted that the outer end of each of the shafts 82 and 84 are provided with short crank arms 96. The crank arms 96 are oscillated by air cylinders 98 and 100 carried from brackets 102 and 104, respectively. Brackets 102 and 104 are preferably mounted from the chamber side members in the manner shown. Each of the cylinders 98, 100 are drivingly connected with a horizontal actuation bar assembly 106 which comprises a pair of spaced bars or plates joined by plates 108 to which the piston rods of the cylinders 98 and 100 are connected as shown. The drive bar assembly 106 is guided for horizontal movement by pairs of rollers 110 carried at its opposite ends and riding in guideways 112. A link member 114 extends downwardly from between each pair of rollers 110 and is pivotally connected to a respective crank arm 96. As can be appreciated, the air cylinders 98 and 100 are actuated simultaneously to thereby produce oscillation of the shafts 82, 84 and lifting movement of the valve members 78. It should be noted that the FIG. 5 showing illustrates the drive bar 106 at its total left-hand end of movement with the valve elements in a closed position as illustrated in FIG. 4. When the air cylinders 98 and 100 are actuated to move the bar 106 to the right, an opening movement of the valves takes place only when the rollers 110 are passing through the dashed line position. At the completion of the stroke to the dash-dot line position of the rollers, the valves have again been moved to a closed position. During opening and closing of the valve members 78, the resilient lower surface 80 is compressed on closing and decompressed on opening as shown in FIG. 6. Consequently, a seal is effected between the resilient lower surface and the bottom wall 72 throughout a major portion of valve movement. Thus, actual opening of the valves takes place only during the short period that the rollers 110 are passing through the dashed line position. Thus, the opening is dependent only upon the speed of actuation of the air cylinders which can be relatively rapid.

As mentioned earlier, the air impulses directed against the upper surface of the foraminous sheet 50 must be laid out in a pattern corresponding generally to the desired pattern of grease dispersion. This pattern is, of course, dependent upon the particular type of pan or other grease-receiving surface passing beneath the sheet 50 on the conveyor belt 28. Although it would be theoretically possible to form the desired openings directly in the bottom wall 72, such an arrangement would greatly increase the complexities of the valving and, similarly, would limit the ability of the apparatus to be used for many different types of pans or the like. In the subject device, the desired pattern of air impulse jets is achieved by the use of a pattern plate 120 which is simply a large rectangular metal plate having the desired air outlet orifice arrangements formed therein. In the embodiment shown, the outlet orifices 122 are laid out in small groups corresponding to the receptacles in the cupcake-type pan 16. The plate 120 is removably received closely adjacent the bottom wall 72. For reasons which will subsequently be discussed, it is neither necessary nor desirable that a seal be achieved between the mating surfaces of bottom wall 72 and plate 120. In the subject embodiment, the plate 120 is held in position adjacent the bottom wall 72 by grooves 121 (see FIG. 5) extending inwardly from the chamber walls 68. Extending upwardly from the left-hand end of plate 120 (as viewed in FIG. 4) is a connecting plate 123 which is releasably connected to the left-hand side wall 66 of the air chamber 64. Plate 123 holds the pattern plate 120 in position and provides some sealing so that air is not directed laterally when the valve members 78 are open and the gap or space between the pattern plate and the bottom wall of the air chambers is pressurized. To remove or change the pattern plate, the releasable connecting means are released and the plate pulled outwardly.

As mentioned, the outlet orifices 122 have a pattern corresponding to a desired grease dispensing pattern. Additionally, certain of the orifices are inclined (for example, 15–30 degrees), as shown, so that the somewhat vertical sidewalls of the pan or cupcake openings are also covered with grease. These orifices 122 do not necessarily correspond to any of the outlet openings 74 of bottom wall 72. However, when the valve members 78 are open, air under pressure acts against the upper surface of plate 120 causing it to move slightly away from the bottom wall 72. As shown in FIG. 6, a small gap g develops between plate 120 and bottom wall 72. This gap g is slightly greater than the normal sliding clearance between the plates. However, it will normally be no greater than approximately 1/16 of an inch. The small gap developed when the valve members 78 are open serves as a low-volume distribution chamber for air coming from outlets 74. This permits the plate 120 to have substantially any desired orifice arrangement and does not require any change in the major components of the air discharge unit.

As can be appreciated, variations in air pressure, orifice size, and screen size could be made. It should equally well be understood that, with variations in one or the other of these various parameters, the most desirable grease dispensing will be achieved only if certain of the other parameters are also changed. These relationships can be found by experimentation. In the subject device, however, extremely good results have been achieved when the air chamber unit 64 is supplied with air in the range of 15 to 40 psi and preferably at, or slightly below, 20 psi. With air at this pressure, the outlet openings 74 have a diameter of ⅛ inch through plate 72 which is of ⅝ inch in thickness. Additionally, holes 74 are paid out on approximately 1 inch centers. The pattern plate 120 has a thickness of ⅝ inch, and the small orifice outlets formed therethrough are preferably of approximately 3/32 inch in diameter. Additionally, the spacing S between the lower surface of plate member 120 and the sheet member 50 is preferably in the range of from ⅛ inch to ¼ inch. Similarly, the spacing S' between the sheet 50 and the top surface of the pan 16 is desirably in the range of approximately ½ inch.

It should, of course, be understood that the particular type of mesh or screen material used for sheet 50 can also vary and will effect to some extent the quality of grease dispensing. The most desirable results, however, have been achieved when the relationships described earlier are used in conjunction with a wire mesh screen in the range of between 20 and 40 mesh with 45 to 60 percent open area. Screen of this general range and size generally has sufficient rigidity to be properly handled and tracked by the rollers and, also, has openings sufficiently large so as to assist in obtaining a good dispersion of the grease mixture but small enough to hold grease.

As can be readily understood, the speed at which the screen belt is driven depends upon the speed of the conveyor belt and the size and number of pans passing the unit. Preferably, however, the screen should be driven such that with each air impulse, a freshly-greased section of screen is over the pan.

Many different types of controls could be used to interrelate the actuation of the air control valves with the position of a subjacent pan. The particular type of controls used form no part of the invention; however, any type of pan sensing switch or similar mechanism could be used to shift an air pilot valve for supplying air to the air cylinders to produce a reciprocatory movement and valve opening and closing.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. Apparatus for applying to a surface a relatively uniform layer or film of a relatively viscous fluid in a predetermined pattern, said apparatus comprising:
   a sheet of foraminous material having first and second opposed sides and an area greater than said predetermined pattern;
   first means for supporting said sheet with its first said facing and closely adjacent said surface;
   second means for saturating said sheet with said fluid; and,
   air discharge means mounted closely adjacent said second side of said sheet, said air discharge means including:
   a first plate member extending generally parallel to said sheet and having a multiplicity of small, closely-spaced openings extending therethrough and laid out in a pattern corresponding to said predetermined pattern and directed toward the second side of said sheet;
   a second plate member positioned generally parallel to and closely adjacent said first plate member on the side opposite said sheet, said second plate member having a multiplicity of relatively uniformly spaced perforations extending therethrough and directed toward said first plate member;
   air chamber means enclosing said second plate member; and,
   valve means for opening and closing said perforations to allow air from said air chamber means to pass through said first and second plates and discharge through said openings and through said sheet.

2. The apparatus as defined in claim 1 wherein said second plate member is releasably connected to said first plate member whereby second plate members having various opening patterns can be substituted to produce different patterns.

3. The apparatus as defined in claim 1 including actuating means for opening and closing all of said valve means substantially simultaneously.

4. The apparatus as defined in claim 1 wherein said valve means comprise a plurality of bars positioned in generally parallel relationship with each bar adapted to control a plurality of perforations.

5. The apparatus as defined in claim 4 wherein actuating means are provided for moving all of said bars simultaneously.

* * * * *